United States Patent [19]

Kennedy

[11] Patent Number: 4,486,572
[45] Date of Patent: Dec. 4, 1984

[54] SYNTHESIS OF AMPHIPHILIC BLOCK COPOLYMERS AND NETWORKS

[75] Inventor: Joseph P. Kennedy, Akron, Ohio

[73] Assignee: University of Akron, Akron, Ohio

[21] Appl. No.: 511,252

[22] Filed: Jul. 6, 1983

[51] Int. Cl.³ .................. C08L 8/00; C08L 10/10; C08L 8/18; C08L 8/26
[52] U.S. Cl. .................. 525/283; 525/244; 525/311; 525/355; 525/296; 525/303; 525/294; 526/348.7
[58] Field of Search ............... 525/244, 335, 355, 283, 525/311, 296, 303, 359; 526/348.7

[56] References Cited

U.S. PATENT DOCUMENTS

| 3,786,116 | 1/1974 | Milkovich et al. | 525/276 |
| 4,276,394 | 6/1981 | Kennedy et al. | 525/245 |
| 4,316,973 | 2/1982 | Kennedy | 525/335 |
| 4,327,201 | 4/1982 | Kennedy et al. | 526/131 |
| 4,442,261 | 4/1984 | Kennedy et al. | 525/324 |

*Primary Examiner*—Carman J. Seccuro
*Attorney, Agent, or Firm*—Oldham, Oldham, Hudak & Weber Co.

[57] ABSTRACT

A novel terminally functional (i.e., telechelic) polymers having a polyisobutylene are described. The end groups are styryl and can be reacted with conventional monomers to form copolymers having unique physical properties. Copolymerizations with N-vinyl-2-pyrrolidone produce amphiphilic polymers which are useful in the areas of medicine and agricultural chemicals.

7 Claims, 4 Drawing Figures

4,486,572

SYNTHESIS OF AMPHIPHILIC BLOCK COPOLYMERS AND NETWORKS

TECHNICAL FIELD

The invention herein lies in the art of copolymers and more particularly in the art of macromolecular monomers and their copolymerization with conventional monomers. Specifically the invention contemplates the synthesis of styryl-telechelic polyisobutylenes and their copolymerization with vinyl acetate or N-vinyl-2-pyrrolidone to produce novel amphiphilic polymers.

BACKGROUND ART

The invention comprises the synthesis of linear and which will hereinafter be termed "three arm star" polyisobutylenes carrying two and three terminal styryl end groups respectively, and their copolymerization to form novel branched and network polymers. Monomers used in the copolymerization include vinyl acetate and N-vinyl-2-pyrrolidone.

A number of patents in the prior art deal generally with the copolymerization of polyisobutylene. U.S. Pat. No. 4,327,201 discloses the formation of graft copolymers using macromolecular monomers having a polyisobutylene backbone. There is however no disclosure of a styryl-telechelic polyisobutylene having a terminal functionality of either two or three. Further, neither branched nor network copolymers are produced. U.S. Pat. No. 4,342,846 relates to blends of polyester resin and an impact resistant interpolymer comprising crosslinked acrylic or methacrylic rubber, crosslinked styrene-acrylonitrile, and uncrosslinked styrene-acrylonitrile polymer components. There is no disclosure of branched or network copolymers as disclosed by applicant.

U.S. Pat. No. 4,316,973 refers to terminally functional olefin and hydroxy polymers having polyisobutylene as the backbone. There is no teaching of the formation of styryl end groups or copolymerizations with either vinyl acetate or N-vinyl-2-pyrrolidone. U.S. Pat. No. 4,276,394 describes the synthesis of diterminally halogenated polyisobutylenes and their subsequent reaction to form thermoplastic elastomer block copolymers. There is no disclosure of the compounds named in this application. U.S. Pat. No. 4,262,095 describes 3-block copolymers comprising mixtures of plastomeric and elastomeric segments. One disclosed block copolymer is styrene-isobutylene-styrene. There is no disclosure however of a polyisobutylene having single styryl head and tail groups.

U.S. Pat. No. 4,036,788 refers to the use of N-vinyl-2-pyrrolidone and other N-vinyl-lactams in combination with other components to produce anionic hydrogels. The invention contains no recitation of the use of polyisobutylene and thus is not pertinent. U.S. Pat. No. 4,011,178 describes the polymerization of selected methyl branched α-olefins and aromatic monomers such as styrene and α-methylstyrene. Block copolymers are disclosed such as styrene-isoprene-styrene and styrene-butadiene-styrene. There is no teaching however of styryl end capped polyisobutylene or of the copolymers taught by applicant.

U.S. Pat. No. 3,786,116 is a rather comprehensive patent dealing in general with the various types of graft copolymers which can be produced utilizing polyisobutylene. There is no disclosure of the use of styryl end groups to produce subsequent copolymerizations having branched or network characteristics.

DISCLOSURE OF THE INVENTION

It is accordingly an aspect of the invention to produce a telechelic, that is terminally functional, polyisobutylene in which the terminal groups are styryl.

It is another aspect of the invention to produce a polyisobutylene, as above, wherein the terminal functionality is two or three.

It is yet another aspect of the invention to produce amphiphilic polymers, that is, polymers soluble or swellable in both aqueous and organic solvents.

It is still another aspect of the invention to produce amphiphilic polymers, as above, from the reaction of styrene-terminated polyisobutylenes and conventional monomers.

It is yet another aspect of the invention to produce amphiphilic polymers, as above, wherein the conventional monomers are vinyl acetate and N-vinyl-2-pyrrolidone.

These aspects and others which will become more apparent from a detailed reading of the disclosure, are achieved by: a telechelic polyisobutylene, comprising:

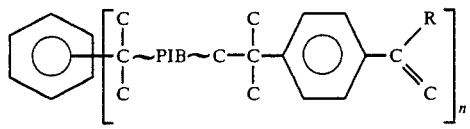

wherein PIB is polyisobutylene having a molecular weight from about 500 to about 50,000, n is two or three and R is —H or —CH$_3$.

A copolymer comprising:
the reaction product of:

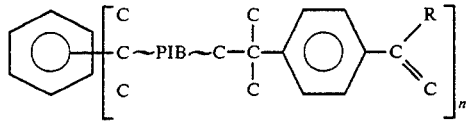

wherein
PIB is polyisobutylene having a molecular weight from about 500 to about 50,000, n is two or three and R is —H or —CH$_3$,
and a monomer selected from the group consisting of N-vinyl-2-pyrrolidone, hydroxyethyl methacrylate, acrylamide and vinyl acetate;
wherein said copolymer is amphiphilic.

BEST MODE FOR CARRYING OUT THE INVENTION

Figure 1:
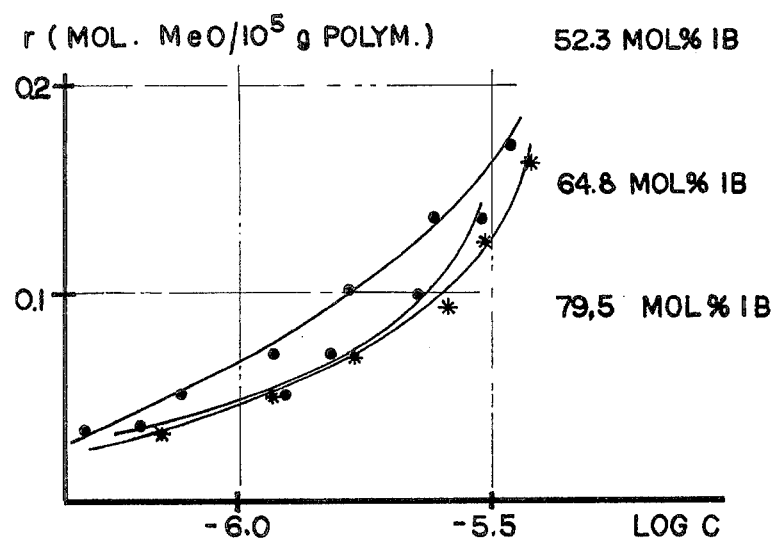
FIG. 1 is a plot of binding isotherms of Methyl Orange.

The terminally functional polyisobutylenes of this invention have the following generalized formula:

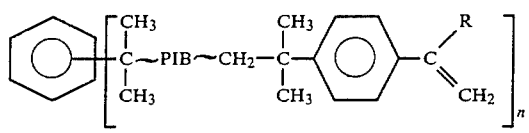

where PIB is a polyisobutylene chain having a molecular weight of from about 500 to about 50,000, R is —H or —CH₃, and n is 2 or 3. When n is 2, the polymer is linear, i.e., the styryl polyisobutylene groups are para to each other on the central phenyl ring. When n is 3, the groups are meta to each other, forming a "three arm star". Because the central phenyl ring itself has little significance from the standpoint of physical properties or polymer structure, it is sometimes hereinafter deleted, replaced by a single "PIB" notation. The two structures should however be considered identical.

Examples 1 and 2 illustrate the synthesis of linear and three arm star styryl telechelic polyisobutylenes respectively. The following scheme represents the reactions involved in the synthesis:

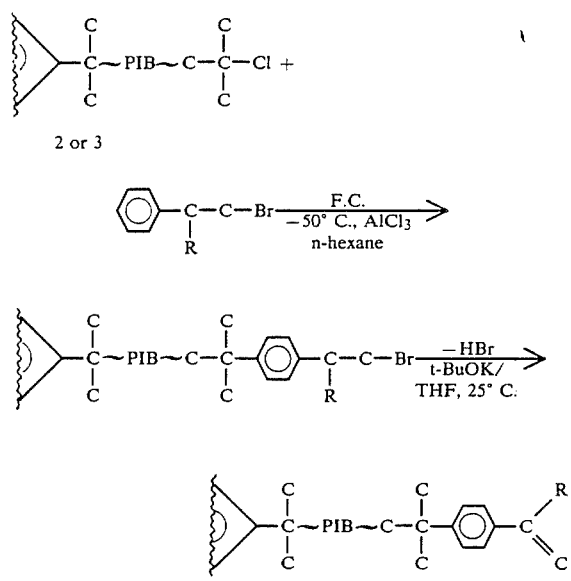

where F.C.=Friedel-Crafts acid such as BF₃, AlCl₃, TiCl₄, SnCl₄ or BF₃OEt₂ (the preferable Friedel-Crafts acid is AlCl₃) and R=H or CH₃.

The linear and three arm star PIB's carrying tert.-chlorine end groups, used as starting materials, were prepared according to the teachings of U.S. Pat. No. 4,276,394, which is hereby incorporated by reference. Briefly this preparation involves the polymerization of isobutylene in the presence of p-dicumyl chloride, resulting in retention of chloro groups at the head and tail of the polymer with a residual phenyl moiety in the center. The Friedel-Crafts alkylations were carried out in the presence of excess (2-bromoethyl)benzene (BrEBz) or beta-bromoisopropylbenzene (BrPBz). Dehydrobromination to yield the respective styrlytelechelic polyisobutylene proceeds rapidly in the absence of side reactions.

The styryl end-group concentration for both the linear and three arm star telechelic products was determined quantitatively. Two independent methods were used: ¹H-NMR spectroscopy and UV spectroscopy in conjunction with $\overline{M}_n$ determination by GPC. The results of these determinations are shown in Table I. The agreement between the data obtained by the ¹H-NMR and UV methods is good. According to these results the linear and the three arm star styryl-telechelic polyisobutylenes carry essentially 2.0 and 3.0 styryl end groups, respectively.

Having been sufficiently characterized, the styryl-telechelic polyisobutylenes were copolymerized with vinyl acetate (VAc), N-vinyl-2-pyrrolidone (VP), hydroxyethyl methacrylate and acrylamide to produce amphiphilic polymers, that is, polymers which dissolve or swell in both water and hydrocarbon solvents. A generalized scheme representing the route to amphiphilic materials is as follows:

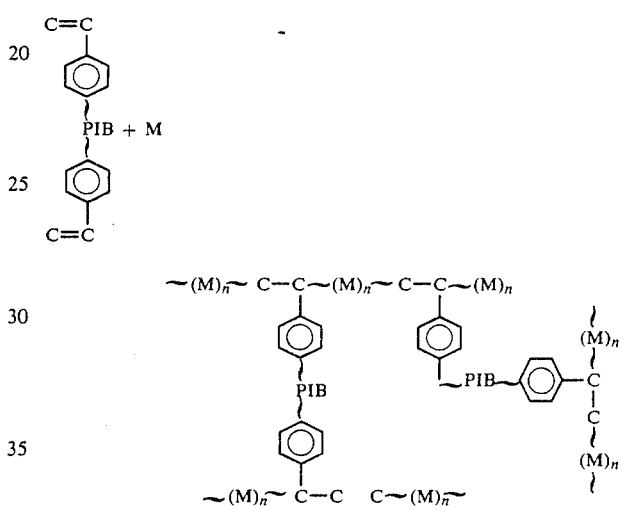

where monomer M is water soluble and (Mₙ) is a water soluble sequence, n indicating the average.

In addition to the above mentioned monomers, the styrene end groups are readily copolymerizable with a large variety of other monomers using conventional free radical techniques. The copolymerization with VP is especially attractive because of the relatively low cost of this monomer and because of its biocompatibility, making it suitable for medical applications.

As the examples below indicate, the copolymerization of St-PIB-St with VP produced water and hydrocarbon swellable networks. As anticipated, the detailed characterization of these amphiphilic networks was difficult because of the incompatibility of the two sequences, viz. PIB and PVP. Thus, meaningful crosslink density (swelling) measurements could not be carried out. Further, because the networks are insoluble, only a few spectroscopic techniques (e.g., IR) are useful.

The copolymerization of both the linear (St-PIB-St) and three arm star

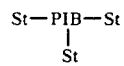

with VP are summarized in the Examples and the results compiled in Table II. Because free radical copolymerization of St with VP produces random products (the respective reactivity ratios being $r_{St}=15.7$ and $r_{VP}=0.045$), the networks in styryl-telechelic PIB/VP systems were also expected to be random. In line with this, it was observed that as the styryl-telechelic PIB concentration in the feed increased, the PIB concentration in the network increased correspondingly.

Because of the much higher reactivity of St compared to VP, network formation occurs at the early stages of copolymerization. At high conversions, particularly in the presence of chain transfer, VP homopolymer will form and can be removed by extraction. Increasing the styryl end group concentration decreases the amount of extractable PVP. Because the networks formed in this copolymerization contain two polymer sequences, i.e., PIB and PVP connected in a random manner, the networks can be described by two $\overline{M}_c$'s i.e., molecular weights between crosslinking points. In case of the linear St-PIB-St $\overline{M}_{c,PIB}$ is identical to the $\overline{M}_n$ of the styryl-telechelic PIB. The $\overline{M}_{c,PIB}$ of the three arm star PIB is equal to one-third of the $\overline{M}_n$ of the

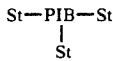

starting material. In this case the $\overline{M}_{c,PIB}$ is the $\overline{M}_n$ of the PIB sequence between a styryl crosslinking site and the central phenyl group in the three arm star PIB. The other $\overline{M}_c$, that is the $\overline{M}_n$ of PVP between two styryl crosslinking sites $\overline{M}_{c,PVP}$, may be estimated by knowledge of the overall composition of the network and the $\overline{M}_n$ of the styryl-telechelic PIB and assuming essentially complete network formation. For example, for the network containing 66.2% PIB (Table II) $\overline{M}_{c,PIB}=7800$ and $\overline{M}_{c,PVP}=7900$.

Table II also shows glass transition temperature ($T_g$) data. The presence of two $T_g$3 s indicates extensive phase segregation in these materials. The fact that the high temperature $T_g$ ($T_{gPVP}$) increases with increasing PIB content is due to increased network density. The low temperature $T_g$ ($T_{gPIB}$) is lower for the network obtained with St-PIB-St ($-70$ to $-62$ degrees C.) and that of the

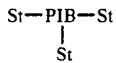

($-60$ to $-58$ degrees C.). This phenomenon is due to the higher $\overline{M}_c$ in the former network.

Figure 2:
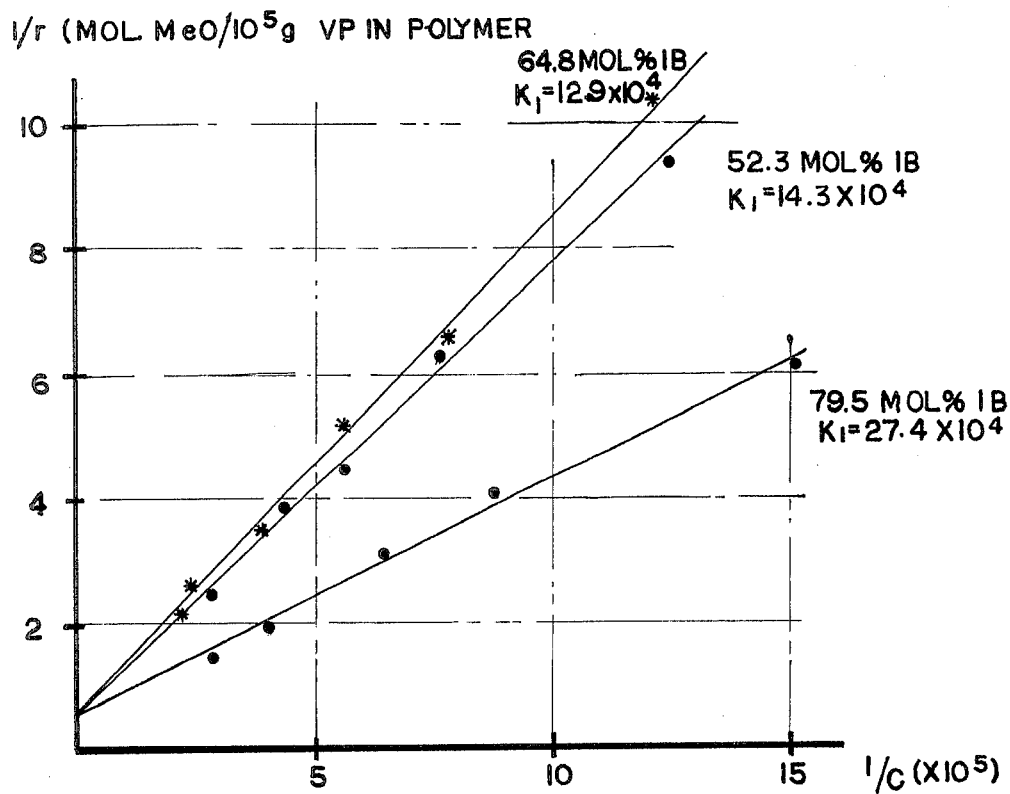
FIG. 2 shows Klotz plots for Methyl Orange.

The ability of the copolymers to bind small organic molecules is an indication of their usefulness as amphiphilic networks. Accordingly, crosslinked PVP/PIB block copolymers (c.l. PVP-b-PIB) were found to bind to methyl orange (MeO) and benzene. These experiments are detailed in Examples 10 and 11. The amount of MeO bound by the amphiphilic network r as a function of MeO equilibrium concentration in the aqueous phase C has been determined. FIG. 1 shows the binding isotherms. The first binding constant $k_1$, i.e., the parameter that quantitatively characterizes the binding ability of the networks, was thereafter obtained from the slope of linear Klotz plot shown in FIG. 2. It was unexpectedly observed that the $k_1$'s of the amphiphilic networks were significally higher than those of prior art hydrophilic gels of crosslinked PVP or serum albumin, materials known to possess exceptionally high binding ability for MeO.

Figure 3:
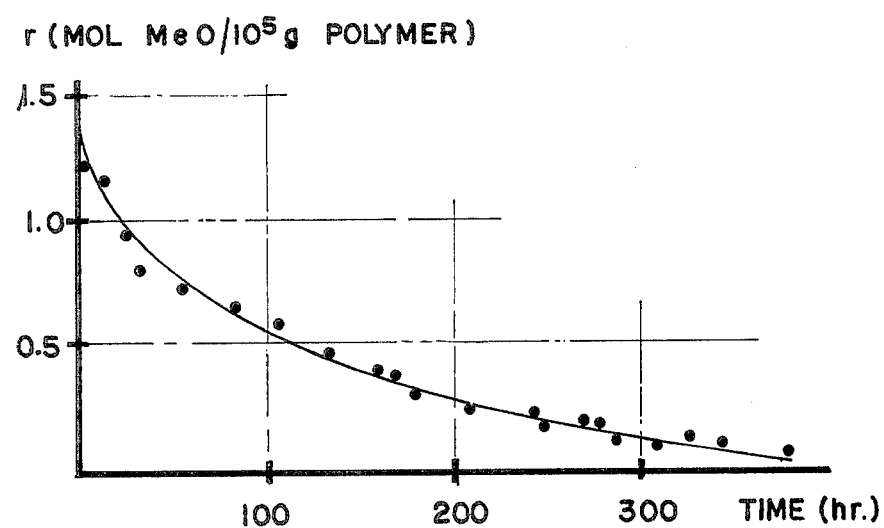
FIG. 3 illustrates desorption characteristics of Methyl Orange in a polymer of the invention.

The binding of MeO by these networks does not decrease with increasing isobutylene (IB) content. In fact the network containing the largest amount of PIB exhibits the highest $k_1$ in spite of the fact that the crosslinked PIB was found not to bind MeO. The strong interaction between MeO and these amphiphilic networks has been confirmed by studying the rate of MeO desorption from one of these gels. According to the results of a representative desorption experiment shown in FIG. 3, the desorption of MeO from c.l.PVP-b-PIB networks is a rather slow process. Accordingly, these amphiphilic networks have great utility in the area of delayed drug release.

The networks also showed excellent binding ability for apolar molecules such as benzene. Example 11 describes an experiment in which water contaminated by benzene ([benzene]$=4.47\times 10^{-3}$M) was contacted with an amphiphilic network containing 83.3 mole percent PIB. After 48 hours the benzene concentration decreased signficantly ([benzene]$=0.25\times 10^{-3}$M). This indicates a strong hydrophobic interaction between apolar PIB blocks and benzene, and between the apolar moiety PVP and benzene.

The copolymerization of styrene-telechelic PIB's with vinyl acetate produced readily characterizable soluble branched block copolymers through the coreaction under free radical conditions of St-PIB-St and VAc. The reactivity ratios of VAc and St are quite different, indeed, St may be regarded as an inhibitor in VAc polymerizations. Thus mixtures of VAc and St-PIB-St, i.e., systems containing VAc and a low molar concentration of styryl functions would behave as VAc polymerizations inhibited by St yielding soluble products consisting of one St-PIB-St unit connected to one, two, three or four PVAc sequences. In addition, branchy-branch formation in the PVAc sequences by chain transfer may also occur. These soluble branched amphiphilic products are designated brPVAc-b-PIB. This nomenclature is to be understood as indicating both that the branch points are styryl units and that the PVAc sequences are branchy.

Example 5 describes a series of St-PIB-St/VAc copolymerizations. As shown by the data in Table III, by increasing the St-PIB-St concentration in the feed, the PVAc content in the copolymer decreased. The fraction recovered by precipitation into n-hexane was PIB possessing the initial $\overline{M}_n$ of the St-PIB-St, indicating that recombination of St-PIB-St radicals did not occur. Precipatation into methanol yielded PVAc which suggest a combination of PVAc radicals or chain transfer processes.

Glass transition temperatures of brPVAc-b-PIB samples were obtained. According to DSC measurements, a high and a low temperature $T_g$ was found indicating extensive phase segregation into PVAc ($T_g=26$ to 20 degrees C.) and PIB ($T_g=-60$ to $-63$ degrees C.) domains. The $T_g$'s of authentic PVAc and PIB are 32 degrees C. and $-73$ degrees C. respectively.

Figure 4:
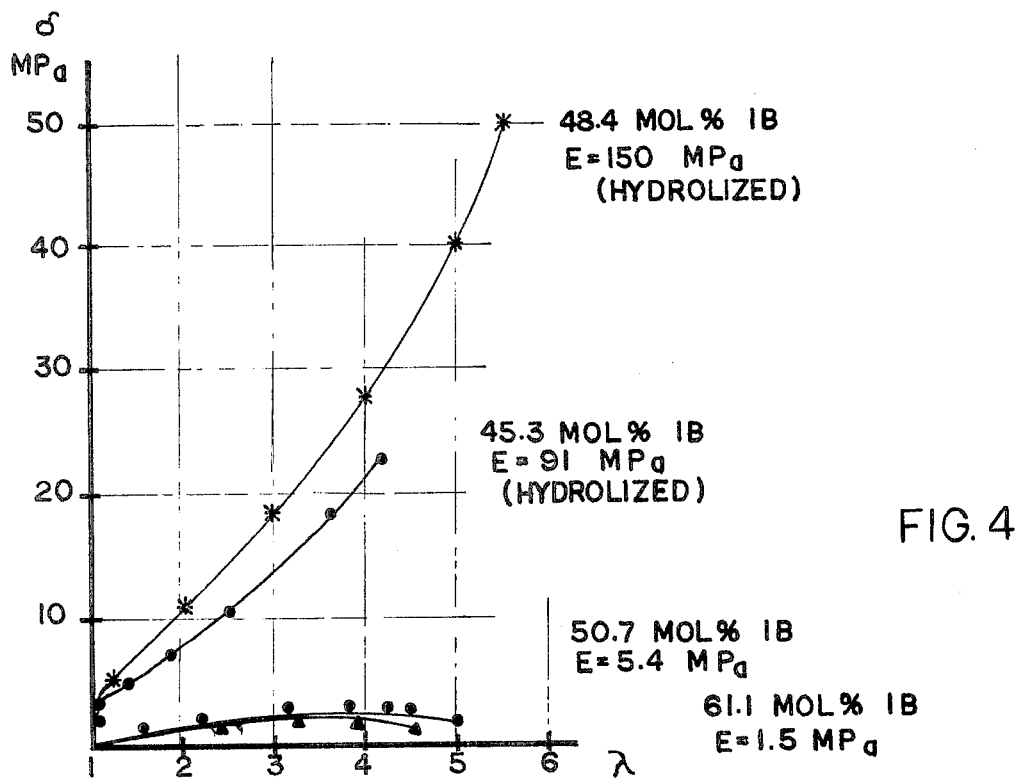
FIG. 4 shows stress-strain curves of the polymers.

Select physical-mechanical properties of brPVAc-b-PIB and partially hydrolyzed brPVAc-b-PIB samples were also determined. The latter materials are in essence random VAc/VA copolymer sequences held together by a PIB sequence. PVAc contains extensive H bridges yielding strong aggregates and consequently improved mechanical properties. FIG. 4 shows stress-strain curves of select samples containing similar amounts of IB units. The partially hydrolyzed samples exhibit a dramatic increase in mechanical properties. These excellent properties are the more remarkable considering the soluble nature of these materials.

The invention is illustrated by the examples which were carried out according to the following procedure and techniques:

MATERIALS

Vinyl acetate (VAc) and N-vinyl-2-pyrrolidone (VP) were purified by distillation at 73 degrees C. and 98 degrees C./9 mm Hg, respectively. Azobisisobutyronitrile, AIBN, was recrystallized from methanol. Benzene was washed with sulfuric acid, then washed several times with water, stored over $CaCl_2$ and freshly distilled. Other solvents were used as received. Methyl orange MeO was used as received.

TECHNIQUES $^1$H-NMR analyses were carried out using a Varian Associates T-60 NMR spectrometer. Solutions of approximately 10% polymer in $CCl_4$ were employed.

IR spectra were obtained by the use of a Perkin-Elmer 521 Grating Infrared Spectrophotometer. UV spectra were recorded on a Perkin-Elmer 559A UV/VIS spectrophotometer. Aqueous methyl orange ($\lambda_{max}=464$) and benzene ($\lambda_{max}=256$ nm) solutions were used to construct calibration curves.

GC measurements were carried out by using a Hewlett-Packard 7610A gas chromatograph equipped with SE30 columns at 70 degrees C. Benzene in toluene was used to construct the calibration curve.

$T_g$ data were obtained by a DuPont 990 Thermal Analyzer at three scanning rates and the data were extrapolated to 0 degrees C./min.

Stress-strain data were obtained on an Instron Universal Testing Instrument with 1 in/min crosshead speed at room temperature.

EXAMPLE 1

α,ω-Di(styryl)polyisobutylene and α,ω-di(α-methyl-styryl)polyisoubutylene

A 5%, (w/w) solution of 15 g α,ω-di[(2-bromoethyl)-phenyl]polyisobutylene in 300 ml dry THF was charged into a three-necked flask equipped with stirrer and condenser under dry nitrogen, then 3.36 g t-BuOK (ca. 6 times molar excess of α,ω-di[(2-bromoethyl)-phenyl]pclyisobutylene in 15 ml THF was added. After stirring 24 hours at room temperature, 300 ml n-hexane was added. Subsequently, the solution was washed with distilled water several times, dried with $MgSO_4$ and filtered. Finally, the solvent was evaporated and the product was futher dried under vacuum at ambient temperature to give α,ω-di(styryl)polyisobutylene. The synthesis of α,ω-di(α-methylstyryl)polyisobutylene was carried out by the same procedure using α,ω-di[(β-bromoisopropyl)phenyl]polyisobutylene.

EXAMPLE 2

Triarm star styryl-terminated and triarm star α-styryl-terminated polyisobutylenes were prepared using the procedure of example 1 by subsituting the corresponding triarm star bromethyl phenyl polyisobutylene starting materials.

EXAMPLE 3

Copolymerization of linear styryl and α-methyl-styryl-telechelic PIB's with VP were carried out according to the following free radical polymerization procedure:

Copolymerizations were carried out in ampules using AIBN initiator and benzene solvent in degassed systems at 60 degrees C. for 72 hours and at 50 degrees C. for 34 hours. Homopolymers and unreacted styryl-telechelic PIB's were removed by fractional precipitation. The insoluble c.l. PVP-b-PIB was recovered by precipitation into methanol and well extracted sequentially with n-hexane and water at room temperature for 24 hours to remove residual styryl-telechelic PIB and PVP, respectively.

EXAMPLE 4

Copolymerizations of three-arm star styryl and α-methylstyryl-telechelic PIB's with VP were carried out using the same procedure as in Example 3.

EXAMPLE 5

Copolymerization of Styryl-Telechelic PIB with Vinyl Acetate

This example was carried out as in Example 3 except with VAc monomer. brPVAc-b-PIB in benzene was precipitated 3 times into n-hexane to remove St-PIB-St, then redissolved in benzene and precipitated 3 times into methanol to remove PVAc.

EXAMPLE 6

Copolymerizations of linear styryl and α-methylstyryl-telechelic PIB's with hydroxyethyl methocrylate were carried out using the procedures of example 3.

EXAMPLE 7

Copolymerizations of three arm star styryl and α-methylstyryl-telechelic PIB's with hydroxyethyl methacrylate were carried out using the procedures of example 3.

EXAMPLE 8

Copolymerizations of linear styryl and α-methylstyryl-telechelic PIB's with acrylamide were carried out using the procedures of example 3.

EXAMPLE 9

Copolymerizations of three arm star styryl and α-methylstyryl-telechelic PIB's with acrylamide were carried out using the procedures of example 3.

EXAMPLE 10

Binding of Methyl Orange With c.l. PVP-b-PIB

The first binding constant $k_1=nk$ (where k is the intrinsic binding constant and n is the number of binding sites per $10^5$ g VP units) of c.l. PVP-b-PIB was determined as follows: Six mixtures containing 0.10 g polymer and 5 ml of aqueous methyl orange MeO ($[MeO]=0.75\times 10^{-3}$ to 3.75 to $10^{-5}$M) were prepared and stored at 25 degrees C. for 48 hours. The polymers swelled and imbibed MeO, and equilibrium was reached in less than 48 hours, as determined by preliminary experiments. After 48 hours the MeO concentration in the supernatant liquid was determined by UV spectroscopy. The quantity of dye absorbed by the network was obtained by substracting the amount of MeO in the water phase from that initially added to the system. Binding isotherms were obtained by plotting r, mole MeO bound per $10^5$ g network, against log C, equilibrium dye concentration in the aqueous phase in mole/l.

The $k_1$ values were determined from the slopes of linear $1/r'$ against $1/C$ plots (Klotz plots) where $r'$ is the mole MeO bound per $10^5$ g VP units in the network.

Crosslinked PIB was prepared by crosslinking of St-PIB-St ($\overline{M}_n=15,200$) in bulk with AIBN (0.2 wt.%) at 60 degrees C. for 3 days, then extracting with n-hexane (room temperature, 24 hours), adding fresh AIBN (0.2 wt.%) and continuing the heating for two additional days. Conversion to network was ~85%. The binding of MeO by the PIB networks was investigated by the same techniques described above.

The rate of MeO desorption was qualitatively studied by adding a solution of 0.01 g MeO in 20 ml water to 1 g of a network. After equilibrium (48 hours) the network loaded with MeO was removed from the solution and placed into 20 ml of fresh water. After a suitable time interval the quantity of MeO desorbed into the water was determined by UV spectroscopy. The water was removed, replaced by fresh water, and the procedure was repeated until the bound MeO was completely recovered.

EXAMPLE 11
Binding of Benzene

To a solution of $8 \times 10^{-3}$ ml benzene in 20 ml water ($4.47 \times 10^{-3}$M), 50% of saturation, was added 1 g amphiphilic network and after 48 hours (equilibrium) the benzene content of the supernatant determined to $0.25 \times 10^3$M as determined by GC and UV.

The above disclosure represents the best mode and the preferred embodiments of the invention. However, it should not be construed as constituting any limitation on the scope of the invention. The scope is rather defined by the following attached claims.

TABLE I

Number-average functionality of $$Ch_2=CH-Ph\sim PIB\sim Ph-CH=CH_2$$
(with R substituent on each CH)

| $\overline{M}_n$ | R | Number-average functionality | |
|---|---|---|---|
| | | $^1$H-NMR | UV |
| 3100 | H | 1.98 ± 0.05 | 1.95 ± 0.04 |
| 7800 | H | 2.01 ± 0.07 | 1.96 ± 0.05 |
| *3200 | H | 3.03 ± 0.08 | 2.98 ± 0.07 |
| *15200 | H | 3.02 ± 0.04 | 2.96 ± 0.06 |
| 3400 | CH$_3$ | 1.96 ± 0.05 | 1.94 ± 0.05 |

*Three-arm star polymer

TABLE II

COPOLYMERIZATION OF STYRYL—TELECHELIC PIB(M$_1$) WITH VP(M$_2$)

| Monomer Conc. [M] $M_1 \times 10^3$, M$_2$ | | M$_2$/M$_1$ in the feed | AIBN % | PIB Converted to copolymer % | VP TOTAL Conversion % | IB CONTENT in the copolymer, Mol. % from Conversion | M$_2$/M$_1$ in the Copolymer | $\overline{M}_{c,PVP}$ | T$_g$'s of Copolymer$^b$ °C. |
|---|---|---|---|---|---|---|---|---|---|
| \multicolumn{10}{c}{Linear St—PIB—St; $\overline{M}_n$ or $\overline{M}_{c,PIB}$ = 7800} | | | | | | | | | |
| 1.4 | 0.8 | 551 | 0.2 | 82 | 44 | 100 | 34.1 | 270 | 29500 | −70/166 |
| 5.8 | 0.8 | 138 | 0.2 | 84 | 78 | 99 | 52.3 | 128 | 14200 | −68/173 |
| 11.5 | 0.8 | 69 | 0.2 | 81 | 84 | 99 | 66.2 | 71 | 7900 | −62/176 |
| \multicolumn{10}{c}{Three-arm star St—PIB—St; $\overline{M}_n$ = 15200; $\overline{M}_{c,PIB}$ = 5070 (St)} | | | | | | | | | |
| 5.7 | 1.13 | 200 | 0.2 | 85 | 62 | 95 | 64.8 | 146 | 8300 | — |
| 5.7 | 1.13 | 200 | 2.0 | 89 | 30 | 98 | 79.5$^c$ | 69 | 3900 | −58/176 |
| 5.7 | 0.56 | 100 | 2.0 | 83 | 44 | 71 | 83.3 | 53 | 3100 | −60/168 |

$^a$In 20 ml benzene at 50° C., for 34 hours.
$^b$T$_{gPIB}$ = −73° C. (14), T$_{gPVP}$ = 154° C., determined in this work
$^c$78.9% by elemental analysis

TABLE III

Copolymerization of St—PIB—St (M$_1$) with VAc (M$_2$)$^a$

| Monomer Concentration [M] | | St—PIB—St Converted to Copolymer | VAc | IB Content of the Copolymer, mol-% by | | $\overline{M}_n^c$ of Copolymer |
|---|---|---|---|---|---|---|
| $M_1 \times 10^{3b}$ | $M_2 \times 10$ | % | % | $^1$H-NMR | from Conv. | |
| 2.56 | 2.16 | 88.8 | 36.5 | 25.7 | 28.0 | 42,400 |
| 5.20 | 2.16 | 78.8 | 34.1 | 45.3 | 42.4 | 22,200 |
| 7.20 | 2.16 | 81.2 | 33.4 | 50.7 | 53.2 | 19,400 |
| 7.89 | 2.16 | 61.9 | 29.7 | 48.4 | 49.8 | 20,600 |
| 10.80 | 2.16 | 80.2 | 29.8 | 61.1 | 64.4 | 15,400 |

$^a$In 20 ml benzene with 0.5% AIBN initiator at 60° C. for 72 hours.
$^b$The $\overline{M}_n$ of St—PIB—St was 7,800.
$^c$Estimated by knowing the overall composition of the copolymer and the $\overline{M}_n$ of the styryl—telechelic PIB.

What is claimed is:

1. A telechelic polyisobutylene, comprising:

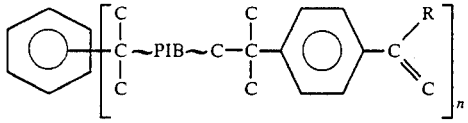

wherein PIB is polyisobutylene having a molecular weight from about 500 to about 50,000, n is two or three and R is —H or —CH$_3$.

2. A telechelic polyisobutylene according to claim 1, wherein n is two and said polyisobutylene has a number average functionality of about 2.0.

3. A telechelic polyisobutylene according to claim 1, wherein n is three and said polyisobutylene has a number average functionality of about 3.0.

4. A copolymer comprising:
the reaction product of:

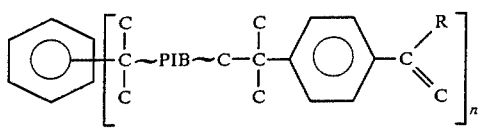

wherein

PIB is polyisobutylene having a molecular weight from about 500 to about 50,000, n is two or three and R is —H or —CH$_3$, and a monomer selected from the group consisting of N-vinyl-2-pyrrolidone, hydroxyethyl methacrylate, acrylamide and vinyl acetate; wherein said copolymer is amphiphilic.

5. A copolymer according to claim 4, wherein said copolymer has a molecular weight of from about 10,000 to about 1,000,000.

6. A copolymer according to claim 5, wherein said monomer is n-vinyl-2-pyrrolidone and said amphiphilic copolymer forms a network.

7. A copolymer according to claim 5, wherein said monomer is vinyl acetate and said amphiphilic copolymer is branched.

* * * * *